Nov. 21, 1961  G. D. FILIPENCO  3,009,319
TURBOJET ENGINE

Filed June 29, 1955 7 Sheets-Sheet 2

INVENTOR.

BY Gregory D. Filipenco

Nov. 21, 1961  G. D. FILIPENCO  3,009,319
TURBOJET ENGINE
Filed June 29, 1955  7 Sheets-Sheet 3

INVENTOR.
BY Gregory D. Filipenco

Nov. 21, 1961 G. D. FILIPENCO 3,009,319
TURBOJET ENGINE

Filed June 29, 1955 7 Sheets-Sheet 4

INVENTOR.

BY Gregory D. Filipenco

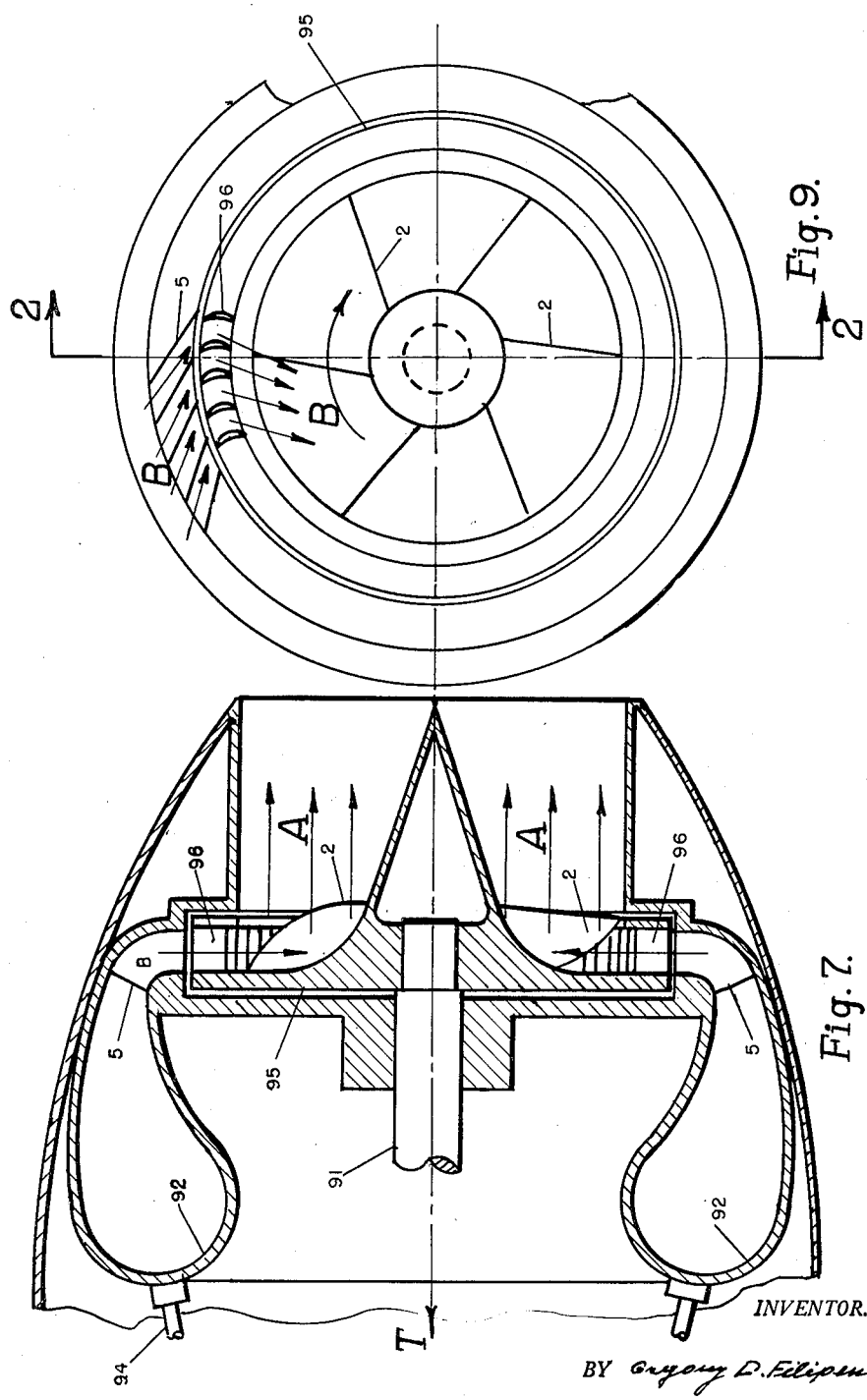

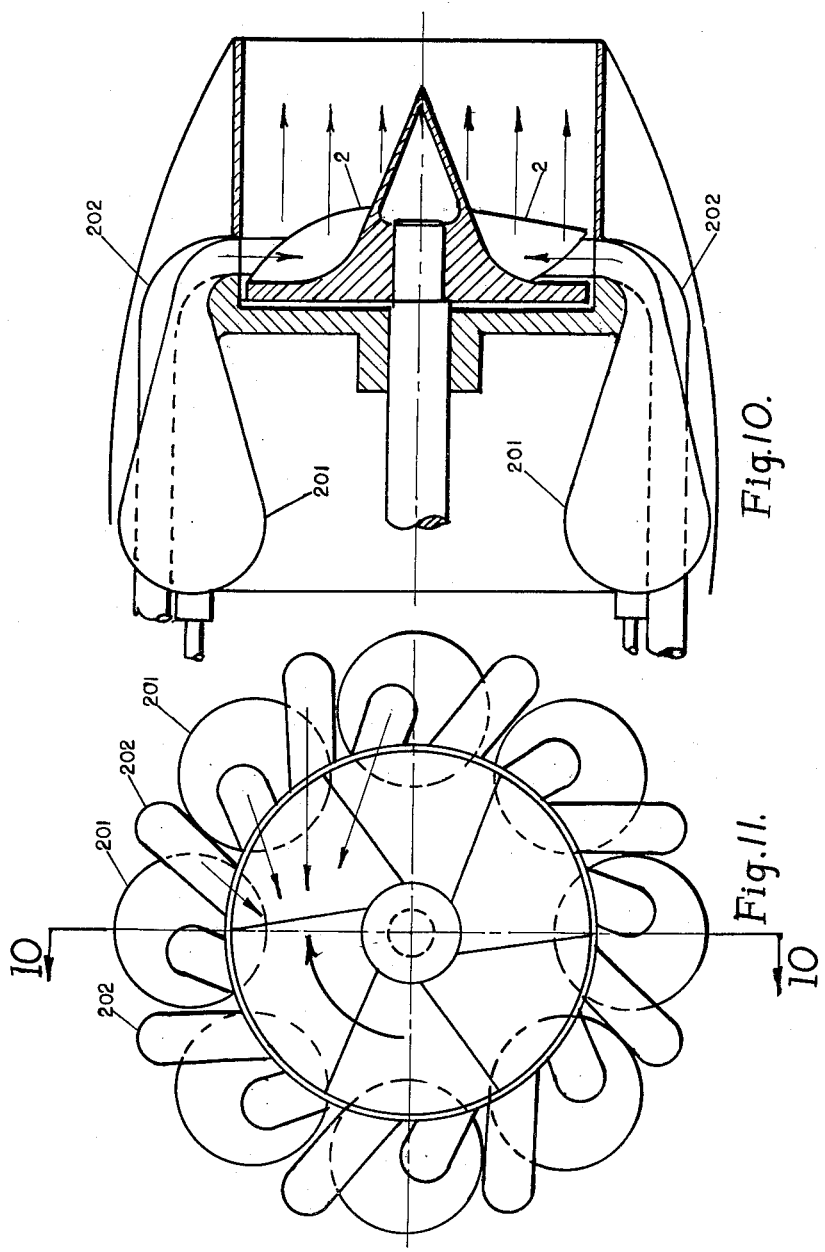

United States Patent Office 3,009,319
Patented Nov. 21, 1961

3,009,319
TURBOJET ENGINE
Gregory D. Filipenco, 234 Penn St., Brooklyn 11, N.Y.
Filed June 29, 1955, Ser. No. 518,863
3 Claims. (Cl. 60—35.6)

This invention relates to aircraft and more specifically to an improved aircraft and engine therefor providing a high degree of maneuverability, efficiency of operation and high speed.

The present trend in aircraft design is in the direction of jet and rocket propulsion and while relatively high speeds are attained, the range of jet powered aircraft for instance is seriously limited and the maneuverability decreases with increased speeds. This invention overcomes the foregoing disadvantages of present aircraft and provides an aircraft and engine structure wherein both high speed and maneuverability are attained as well as materially improved efficiency that enables the craft to operate for materially longer periods of time without refueling.

Another object of the invention resides in the provision of an improved engine for aircraft and other purposes characterized by its simplicity, efficiency and dependability. It incorporates an improved arrangement and co-operation of elements that affords a high degree of thrust accompanied by greatly improved efficiency that is substantially uniform through a wide range of speed.

Still another object of the invention is an improved method and apparatus for utilizing a working medium under pressure in a power plant to attain increased power and more efficient utilization of the fuel.

A further object of the invention resides in the provision of an improved turbo air compressor and method of operation to supply air for combustion of the fuel and that reduces frictional losses heretofore encountered and greatly increases the efficiency of the engine of which it forms a part.

A still further object of the invention is the provision of an improved combustion turbine for aircraft and other purposes.

The above and other objects and advantages of the invention will become more apparent from the following description and accompanying drawings forming part of this application.

In the drawings:

FIGURE 7 is a longitudinal cross sectional view taken along the line 2—2 of FIGURE 9;

FIGURE 9 is an end view of the work screw and rotor of the turbine;

FIGURE 10 is a cross sectional view of FIGURE 11 taken along the lines 10—10 thereof;

FIGURE 11 is a rear elevational view of the work screw and combustion chambers.

Broadly, the invention contemplates an improved aircraft structure and power plant therefor that affords vastly increased efficiency of operation greatly extending the useful range of an aircraft, increased speeds and a high degree of maneuverability that is substantially uniform throughout its wide range of operational speed. While the power plant is particularly useful for aircraft it will become apparent that the power plant and improve components thereof are useful for other purposes.

The power plant which contributes toward the attainment of the foregoing advantages of this invention includes the combination of an improved air compressor, turbine and terminal work screw which individually contribute to the operation of the power plant as a whole to produce an efficiency believed to be of the order of 30 percent or more over the efficiency of conventional jet aircraft known today.

Figure 1:
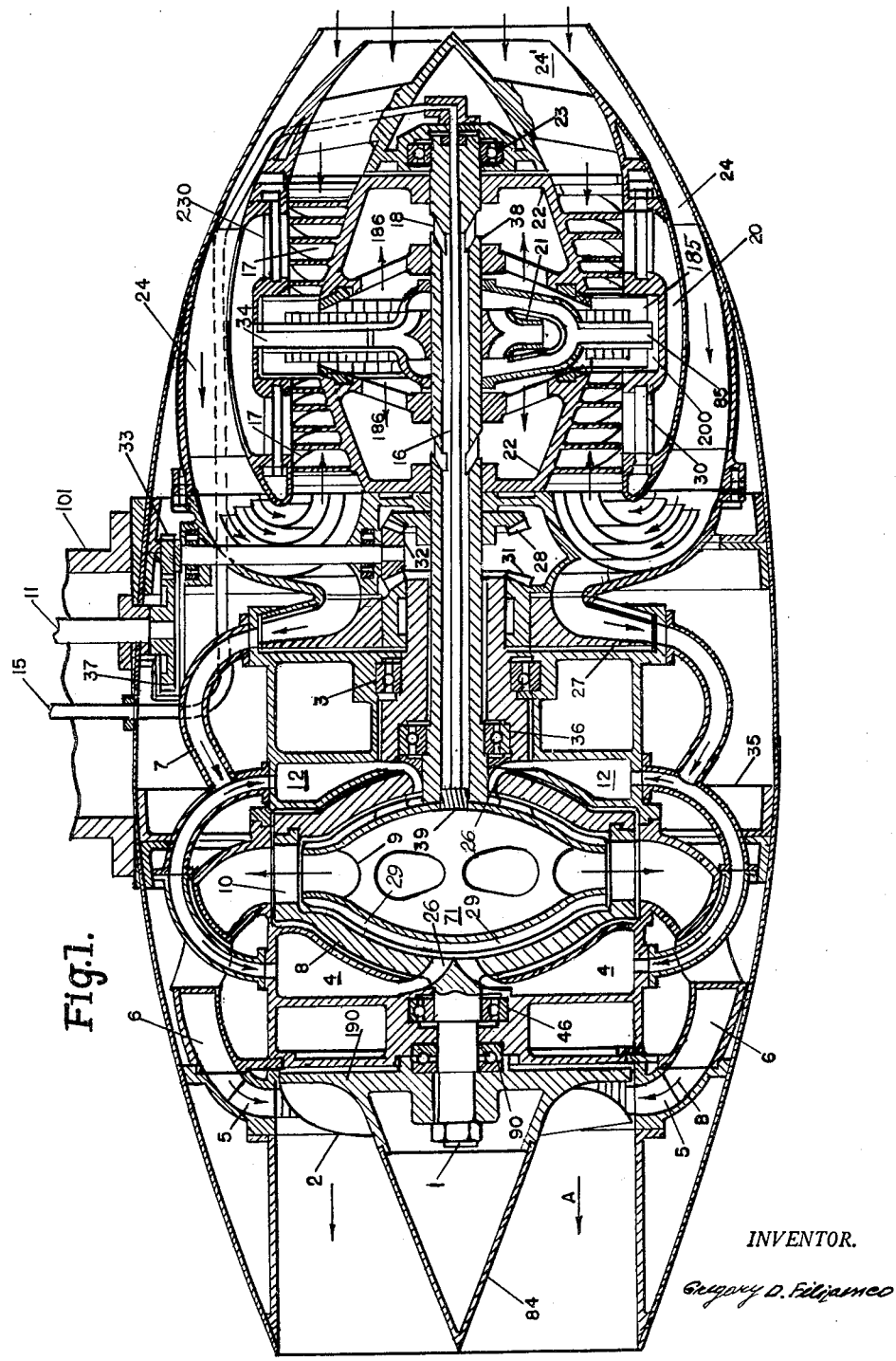
FIGURE 1 is a longitudinal cross sectional view of a power plant in accordance with the invention.
Figure 3:
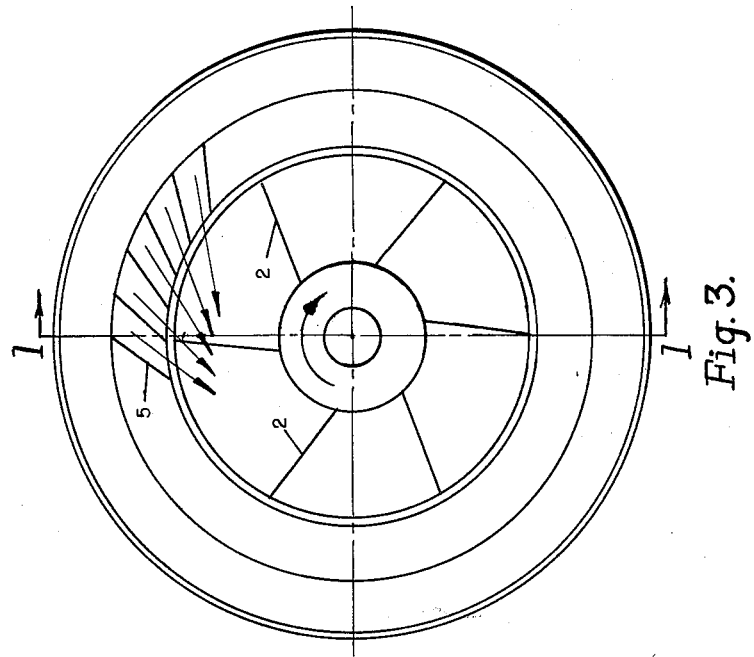
FIGURE 3 is a transverse cross sectional view of the work screw disposed in the left end of the power plant of FIGURE 1.
Figure 4:
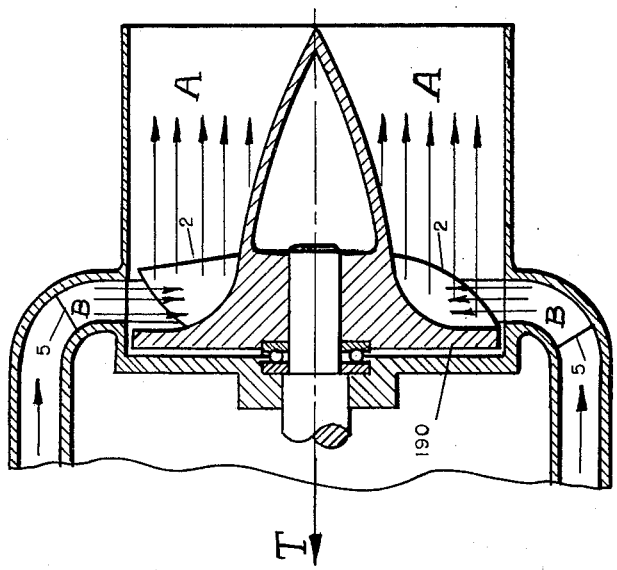
FIGURE 4 is a cross sectional view of FIGURE 3 taken along the line 1—1 thereof.
Figure 5:
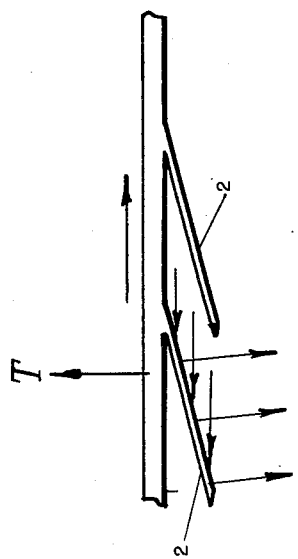
FIGURE 5 is a development of the blade of FIGURES 3 and 4 to illustrate certain features thereof.

Referring now to the power plant shown in FIGURE 1 and more particularly to the details of the work screw 190 secured to the left hand end of the shaft 1 rotatably supported by bearing 90 as illustrated more clearly in FIGURES 3, 4 and 5, it will be observed that it includes a plurality of individual blades 2 positioned about the periphery of the hub of the work screw 190. Surrounding this work screw are a plurality of guide blades 5 adapted to receive a working medium such as compressed gases through inlet passages 6 at pressures preferably above forty atmospheres. The stream of gases having a direction denoted by the arrows impinge upon the leading surface of each blade 2 and are deflected outwardly in a direction generally parallel to the exhaust tube as denoted by the arrows A. The conical end section 84 on the work screw 190 provides an exhaust tube of constantly increasing cross section so that minimum turbulence is encountered. As will be shown the work screw 190 is rotated by shaft 1 in a direction against the flow of the compressed gas stream B and in this way a thrust or force is developed longitudinally of the work screw 190. This procedure provides a highly efficiently system for converting the energy of high pressure of exhaust gases into thrust and the power plant embodying this structure will produce efficiencies of the order of 30 percent greater than those presently encountered with jet engines. While only one combustion chamber is illustrated for the purpose of generating the high pressure exhaust gases, it will become apparent that any number of combustion chambers or other means for producing these exhaust gases may be employed.

In the normal case the air requirements for sustaining combustion of a fuel to produce high pressure exhaust gases is preferably obtained by means of an improved air compressor shown in the right hand end of the power plant illustrated in FIGURE 1. It includes generally two truncated cones 22 arranged in axial alignment with the bases of the cones facing one another. The surface of each cone is provided with a continuous spiral blade 17 arranged to feed air, for the purpose of compression from the outside of each cone toward the center. The outer peripheries of the blades lie in a common cylindrical surface so that the cross sectional area of the space between successive convolutions gradually decreases toward the center of the compressor. The conical members 22 are carried by the central shaft 38 supported generally by the bearings 23 and 36 and the entire assembly is disposed within a circular housing.

The cylinder or circular housing 230 has a plurality of elongated slits 30 slightly offset from the longitudinal axis. The outer housing 230 is then enclosed by a cylindrical housing which forms a circular chamber 20 in communication with the several longitudinally extending slits 30. A pair of impellers 185 carried by the shaft 38 are disposed between the conical members 22 and between these impellers there is a centrifugal pump 21.

Rotation of the shaft 38 operates the centrifugal pump 21 to force liquid such as oil, water or the like into the chamber 20 and then through the slits 30 to form a series of elastic walls or baffles about each of the helical screws carried by the conical sections 22. In addition, rotation of the leading helical screws by the shaft 38 will compress air entering the opening 24' while the trailing screws will compress that portion of the air entering through the circular passage 24. The oil or other liquid used to form the elastic partitions and thus effect compression of the air in the manner described above should preferably be under a pressure of the order of 10 atmospheres. The utilization of a liquid in this manner will not interfere with the rotation of the compressor but on the other hand it will not permit rotation of the air together with the screw. Thus compression of the air is attained. The compressed air mixed with the oil or other liquid will be picked up by the impellers 185 and the air will be discharged into the chambers 186 formed within the conical members 22 while the working fluid or liquid of the compressor will be directed into chamber 200. The liquid is then withdrawn by the suction pipes 85 connected to the centrifugal pump, compressed and then pumped through pipe lines 34 and into chamber 20. The use of the liquid in this way functions not only to attain compression of the air but at the same time provides lubrication for the blades that may be in frictional contact with the internal cylinder wall. The compressed air from the chambers 186 is discharged through openings 18 into the center of the shaft 38 whereupon it is carried into the combustion chamber generally denoted by the numeral 71. A portion of the air entering through the circular passage 24 is moved by a blower 27 through passage 7 to rearward portions of the power plant for cooling purposes as will be described.

Figure 2:
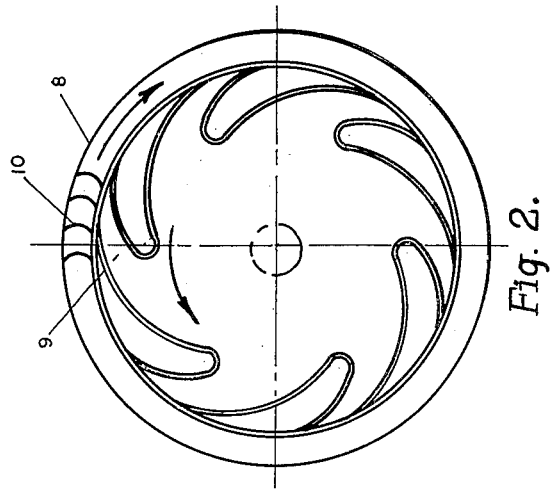
FIGURE 2 is a cross sectional view of certain elements of the combustion chamber, turbine and rotor constituting part of the power plant of FIGURE 1.
Figure 6:
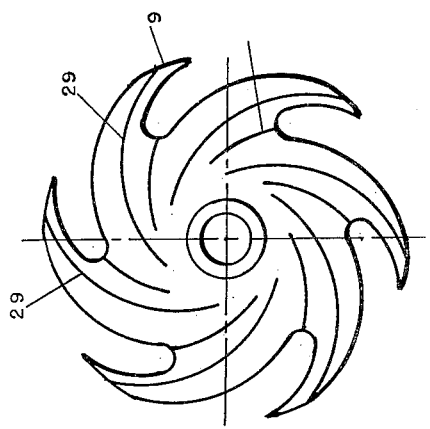
FIGURE 6 is a cross sectional view of the combustion chamber similar to FIGURE 2, illustrating the ribbed surface thereof.

The apparatus for producing products of combustion is in the form of a radial turbine denoted generally by the numeral 71 and is provided with six nozzles 9 (see FIGURES 2 and 6). The combustion chamber is carried by the shaft 38 and constitutes the source of power for rotation of the air compressor previously described. Surrounding the combustion chamber is a rotor 8, shown in FIGURES 1 and 2, rotatably carried by bearings 3 and 46. This rotor 8 is firmly joined on one side to the work screw 190 by means of the shaft 1 and at the other side to a beveled gear 31 that meshes with an intermediate gear 32 and a beveled gear 28 firmly joined to the shaft 38. The gear 32 is fixed on one end of a shaft having on its other end a gear 33 meshing with a gear 37 on a shaft 11 which extends through an engine support 101.

The air entering the combustion chamber 71 passes through a mixing device 39 wherein it is mixed with fuel such as oil, kerosene or the like entering through the fuel line 15—16 that extends centrally of the shaft 38. The burned gases within the combustion chamber 71 pass outwardly through the nozzles 9 imparting rotation to the combustion chamber. These gases then impinge on the blades 10 of the rotor 8 producing rotation of the rotor in a direction opposite to the combustion chamber as may be observed in FIGURE 2. As a result a relative rotation between the combustion chamber 71 and the outer rotor 8 of the order of 10,000 r.p.m. is attained. In this way rotary motion is imparted to the compressor by means of the combined action of both the combustion chamber as well as the surrounding rotor 8. While this turbine is particularly useful for aircraft it is of course equally adaptable for use as a source of power in other vehicles.

It may be desired to cool certain portions of the power plant, particularly in the vicinity of the combustion chamber. For this purpose air is fed through the circular passage 7 into the chambers 4 and 12 surrounding the combustion chamber. The air flows through passages 26 and 29 and after cooling the combustion chamber then passes through the blades 10 of the rotor 8 and is discharged in the manner previously described along with the products of combustion that function to provide thrust.

While the foregoing description of the invention constitutes the preferred embodiment thereof it is evident that certain changes and modifications may be made without departing from the spirit of the invention. For instance, as may be observed in FIGURES 10 and 11, the work screw similar to 190 of FIGURE 1 may be driven by a plurality of combustion chambers 201 which impinge directly upon the blades 2 thereof. In FIGURE 7 the rotor of the turbine or combustion chamber and the work screw (95 in this embodiment of the invention) may constitute a single unit. In this case the combustion chamber denoted by the numeral 92 is generally annular in shape. In this modification the working blades of the turbine 96 rotate the rotor of the work screw 95 carrying the blades 2. The work blades 96 also drive the shaft 91 for the purpose of compressing air as previously described.

Figure 8:
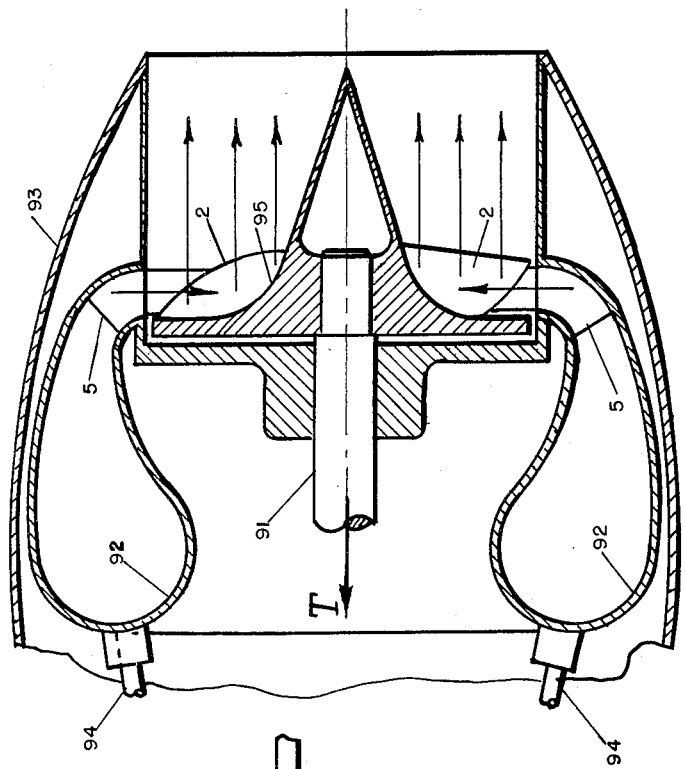
FIGURE 8 is a modified view of the work screw shown in FIGURE 7.

In FIGURE 8 it will be observed that the work screw 95 receives gases directly from the combustion chamber 92 and the shaft 91 carrying the work screw 95 can be rotated by any type of engine.

Figure 12:
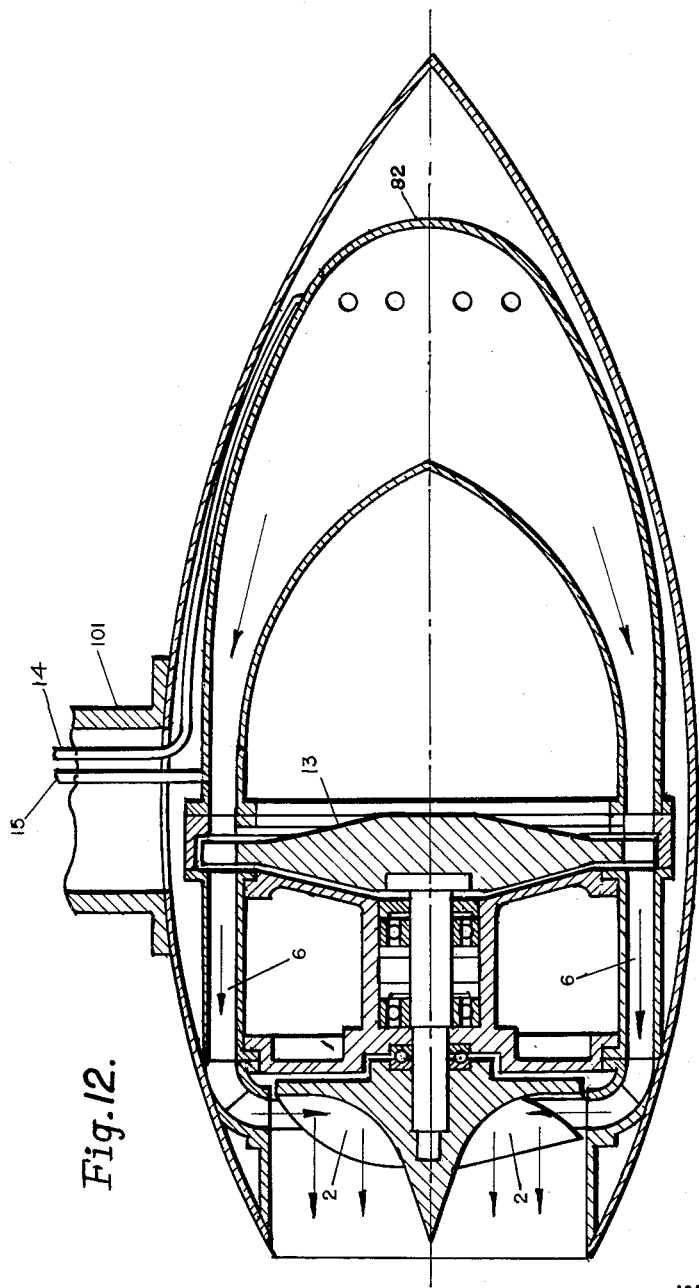
FIGURE 12 is a modified embodiment of a power plant in accordance with the invention.

In cases where the aircraft in accordance with this invention is to be operated at extremely high altitudes and air is not present in sufficient quantities to operate the power plants, a construction such as that illustrated in FIGURE 12 may be employed. For this purpose kerosene may be used together with nitric acid or alcohol with liquid oxygen. Kerosene and oxygen are introduced into the combustion chamber 82 as shown in FIGURE 12 through the fuel lines 15 and 14. The products of combustion drive a turbine 13 and then pass through the circular channels 6 and onto the work blades 2 of the work screw in the manner previously described in connection with FIGURE 1 and other figures.

While only certain embodiments of the invention have been illustrated and described it is apparent that still other modifications, alterations and changes may be employed without departing from the true scope and spirit thereof.

What is claimed is:

1. In a jet engine having means defining an exhaust outlet and means for imparting velocity energy to a gaseous motive fluid exhausted through said exhaust outlet as a jet stream capable of imparting thrust to the jet engine, the improvement which comprises means to increase the thrust of the engine by imparting additional velocity energy to the motive fluid substantially immediately before exhausting it through said exhaust outlet comprising, a rotary driven terminal screw means disposed substantially immediately upstream of the exhaust outlet comprising a rotary driven member for turning the motive fluid through a pattern to exhaust it out of said outlet and imparting velocity energy thereto and having a longitudinal axis substantially corresponding to an axis of said exhaust outlet, said rotary driven member having a row of peripherally disposed angularly spaced blades for rotation therewith disposed extending radially therefrom forming a pitch angle with the longitudinal axis of said rotary member for turning the fluid in a direction toward said outlet, said blades being disposed radially inclined in the direction of rotation of rotary member forming a selected angle of inclination with respect to a plane corresponding with said longitudinal axis, means defining a motive fluid inlet radially outwardly of said blades including means for directing the motive fluid radially inwardly to the screw means perpendicularly to the longitudinal axis thereof, said exhaust outlet having a greater fluid-passage section than said fluid inlet to allow increase of the velocity of the motive fluid passing therethrough, and said pitch and inclination angles being so chosen that the motive fluid is turned by said blades through a pattern of turning in which the fluid is turned in a direction substantially parallel to said discharge outlet axis and discharged axially outwardly through said exhaust outlet as a jet stream at an increased velocity greater than the velocity of the fluid when it enters said screw means.

2. In a jet engine having means including means defining an exhaust outlet and means for imparting velocity energy to a gaseous motive fluid exhausted through said exhaust outlet as a jet stream capable of imparting thrust to the jet engine, the improvement which comprises means to increase the thrust of the engine by imparting additional velocity energy to the motive fluid substantially immediately before exhausting it through said exhaust outlet comprising a rotary driven terminal work screw means disposed substantially immediately upstream of the exhaust outlet comprising a rotary driven member for turning the motive fluid through a pattern to exhaust it out of said outlet and imparting velocity energy thereto and having a longitudinal axis substantially corresponding to an axis of said exhaust outlet, said rotary driven member having a row of peripherally disposed angularly spaced blades for rotation therewith disposed extending radially therefrom forming a pitch angle with the longitudinal axis of said rotary member for turning the fluid in a direction toward said outlet, said blades being disposed radially inclined in the direction of rotation of said rotary member forming a selected angle of inclination with respect to a plane corresponding with said longitudinal axis, means defining a motive fluid inlet radially outwardly of said blades for directing the motive fluid radially inwardly to the screw means perpendicularly to the longitudinal axis thereof including means disposed radially outwardly of said blades for directing the motive fluid toward said blades to impinge thereon in a direction substantially opposed to the direction of rotation of said rotary member in operation, said exhaust outlet having a greater fluid-passage section than said fluid inlet to allow increase of the velocity of the motive fluid passing therethrough, said pitch angle and said inclination angle being so chosen that the motive fluid is turned by said blades through a pattern of turning in which the fluid is turned in a direction substantially parallel to said discharge outlet axis and discharged axially outwardly through said exhaust outlet as a jet stream at an increased velocity greater than the velocity of the fluid when it enters said workscrew means, and a conically shaped member disposed coaxial with said annular means defining said exhauts outlet operably connected to said rotary member for rotation therewith and having surfaces diverging in a direction away from said rotary member thereby defining said exhaust outlet jointly with said annular means.

3. In a jet engine having means including means defining an exhaust outlet and means for imparting velocity energy to a gaseous motive fluid exhausted through said exhaust outlet as a jet stream capable of imparting thrust to the jet engine, the improvement which comprises means to increase the thrust of the engine by imparting additional velocity energy to the motive fluid substantially immediately before exhausting it through said exhaust outlet comprising, a rotary driven terminal workscrew means disposed substantially immediately upstream of the exhaust outlet comprising a rotary driven member for turning the motive fluid through a pattern to exhaust it out of said outlet and imparting velocity energy thereto and having a longitudinal axis substantially corresponding to an axis of said exhaust outlet, said rotary driven member having a row of peripherally disposed angularly spaced blades for rotation therewith disposed extending radially therefrom forming a pitch angle with the longitudinal axis of said rotary member for turning the fluid in a direction toward said outlet, said blades being disposed radially inclined in the direction of rotation of said rotary member forming a selected angle of inclination with respect to a plane corresponding with said longitudinal axis, means defining a motive fluid inlet radially outwardly of said blades for directing the motive fluid radially inwardly to the screw means perpendicularly to the longitudinal axis thereof including fluid guide means disposed radially outwardly of said blades and inclined relative to said plane for directing the motive fluid toward said blades to impinge thereon in a direction substantially opposed to the direction of rotation of said rotary member in operation, said exhaust outlet having a greater fluid-passage section than said fluid inlet to allow increase of the velocity of the motive fluid passing therethrough, said pitch angle and said inclination angle being so chosen that the motive fluid is turned by said blades through a pattern of turning in which the fluid is turned in a direction substantially parallel to said discharge outlet axis and discharged axially outwardly through said exhaust outlet as a jet stream at an increased velocity greater than the velocity of the fluid when it enters said work screw means, a conically shaped member disposed coaxial with said annular means defining said exhaust outlet operably connected to said rotary member for rotation therewith and having surfaces diverging in a direction away from said rotary member thereby defining said exhaust outlet jointly with said annular means, and said rotary member having arcuate surfaces defining spaces between the blades and merging smoothly with said conically shaped member, and said surfaces extending radially away from said conically shaped member and converging to merge smoothly therewith.

References Cited in the file of this patent

UNITED STATES PATENTS

| | | |
|---|---|---|
| 1,141,938 | Crissey | June 8, 1915 |
| 1,142,882 | Johnson | June 15, 1915 |
| 1,868,143 | Heinze | July 19, 1932 |
| 2,062,018 | Wheeler | Nov. 24, 1936 |
| 2,256,198 | Hahn | Sept. 16, 1941 |
| 2,410,538 | Walton | Nov. 5, 1946 |
| 2,439,717 | Cooke | Apr. 13, 1948 |
| 2,446,552 | Redding | Aug. 10, 1948 |
| 2,514,224 | Cushing | July 4, 1950 |
| 2,543,864 | Melenric | Mar. 6, 1951 |
| 2,563,029 | Goddard | Aug. 7, 1951 |
| 2,580,207 | Whittle | Dec. 25, 1951 |
| 2,588,532 | Johnson | Mar. 11, 1952 |
| 2,621,871 | Robert | Dec. 16, 1952 |
| 2,623,356 | Coanda | Dec. 30, 1952 |
| 2,626,501 | Pavlecka et al. | Jan. 27, 1953 |
| 2,630,677 | Seifert | Mar. 10, 1953 |

FOREIGN PATENTS

| | | |
|---|---|---|
| 547,539 | France | Sept. 25, 1922 |
| 147,825 | Germany | Feb. 4, 1904 |
| 471,671 | Great Britain | Sept. 8, 1937 |
| 537,286 | Great Britain | June 16, 1941 |
| 557,952 | Great Britain | Dec. 13, 1943 |